United States Patent [19]

Sy

[11] Patent Number: 5,054,424

[45] Date of Patent: Oct. 8, 1991

[54] AQUARIUM ECOSYSTEM

[76] Inventor: Leng K. Sy, 34135 Pacific Coast Hwy., Ste. A, Dana Point, Calif. 92629

[21] Appl. No.: 513,952

[22] Filed: Apr. 24, 1990

[51] Int. Cl.⁵ .................. A01K 63/04; A01K 63/06
[52] U.S. Cl. ............................... 119/5; 210/169
[58] Field of Search .................. 119/3, 5, 2; 210/169

[56] References Cited

U.S. PATENT DOCUMENTS

| | | | |
|---|---|---|---|
| 3,135,238 | 6/1964 | Eyl | 119/5 |
| 3,557,753 | 1/1971 | Dantoni | 119/5 |
| 3,638,795 | 2/1972 | Feddern et al. | 210/169 |
| 3,661,262 | 5/1972 | Sanders | 119/5 |
| 3,683,177 | 8/1972 | Veloz | 119/5 |
| 3,749,901 | 7/1973 | Clough | 119/5 |
| 3,848,567 | 11/1974 | Garber | 119/5 |
| 3,929,101 | 12/1975 | Katz | 119/5 |
| 3,971,338 | 7/1976 | Alexson | 119/5 |
| 3,971,947 | 7/1976 | Lambert et al. | 119/5 |
| 4,002,566 | 1/1977 | Smith | 210/169 |
| 4,052,960 | 10/1977 | Birkbeck et al. | 210/169 |
| 4,206,719 | 6/1980 | Faris | 119/5 |
| 4,606,821 | 8/1986 | D'Imperio | 210/169 |
| 4,684,462 | 8/1987 | Augustyniak | 210/97 |
| 4,687,575 | 8/1987 | Grose | 119/5 |
| 4,728,420 | 3/1988 | Abercia, Jr. | 210/169 |
| 4,787,336 | 11/1988 | Lineberry | 119/5 |
| 4,851,112 | 7/1989 | Schlensker | 210/123 |
| 4,861,465 | 8/1989 | Augustyniak | 119/5 |
| 4,915,828 | 4/1990 | Meyers et al. | 210/169 |

FOREIGN PATENT DOCUMENTS

2072523 10/1981 United Kingdom ............ 119/5

Primary Examiner—John G. Weiss
Attorney, Agent, or Firm—Knobbe, Martens, Olson & Bear

[57] ABSTRACT

An ecosystem is created in an aquarium using a main tank and a filter tank. The main tank provides a suitable environment for aquatic animals and has a series of tubes along the bottom to distribute incoming water. An outlet near the high water mark of the main tank creates bottom to top circulation. The water is pumped through the filter tank that comprises a carbon filter, a plant and temperature compartment, a bacteria filter, and an aerator compartment. Water from the main tank is withdrawn and processed through each compartment in the filter tank to remove all the impurities harmful to the animals in the main tank by nitrification and photosynthesis. A pump returns the cleaned water to the main tank through an ultraviolet light purifier. Valves on the conduits between the main and filter tanks prevent circulation during repair and maintenance of the filter.

29 Claims, 3 Drawing Sheets

AQUARIUM ECOSYSTEM

BACKGROUND OF THE INVENTION

The present invention relates generally to aquariums used to keep and display marine life, and particularly, to aquariums and filtration systems that provide a suitable environment for aquatic animals for extended periods of time.

Aquariums and filtering systems for keeping and displaying aquatic animals are known in the art. Aquariums come in a variety of shapes and sizes. There are also several types of filters for aquariums including ultraviolet light filters, particulate filters and carbon filters. However, none of the systems currently available are effective in creating an ecosystem for the home aquarium.

A particular problem with most systems presently available is the removal of proteins and other impurities that are continuously produced by marine animals living in the aquarium. These impurities can be very harmful, even lethal, to the fish in the aquarium. The problem is aggravated because the proteins and their by-products are often water soluble, and thus, difficult to remove as compared with particulate matter that can be filtered out by most systems. For example, decaying food and fish feces produce ammonia and other nitrogen compounds which can be poisonous to the aquatic animals if allowed to accumulate in the aquarium. Similarly, carbon dioxide can be toxic to the animals in the aquarium if it is allowed to build up.

U.S. Pat. No. 3,557,753 issued to Dantoni attempts to create an ecosystem in a single tank. The system disclosed by Dantoni has a three layer filter with a layer of plants and algae, a layer of calcite and a layer of wool containing microorganisms. The system of Dantoni is not effective because it is not able to remove enough of the impurities. The impurities are continuously being produced by the animals living in the aquarium. The impurities are broken down and removed by the growth of plants and bacteria. The growth rate of the plants and bacteria is increased when the plants receive more light. However, too much light can be harmful to the aquatic animals. Thus, the amount of light received by the plants must be limited since the filter and the animals are in the same tank. Therefore, the plants and bacteria are not completely effective at removing the impurities.

Another problem with the device disclosed by Dantoni is that the filter occupies much of the tank and reduces the space available for the marine animals. Placement of the filter in same tank as the fish also causes problems because filters must be cleaned periodically. The device of Dantoni makes filter maintenance especially difficult because the filter is located at the lowest levels of the aquarium. Cleaning the filter necessitates the removal of the aquatic life to another aquarium so the three layer filter can be accessed.

Other problems with the filter systems presently available is that they are often to large, complex or expensive for use with the typical home aquarium. Some systems are so large that it is not physically practical to use them with home aquariums which tend to be relatively small in size. Other systems are very effective yet they are too complex and require sophisticated adjustment and maintenance. Also, the cost of other filters makes their use with home aquariums prohibitive.

Thus, a need exists for an effective aquarium ecosystem for home aquariums.

It is therefore an object of the present invention to create an ecosystem for home aquariums where an equilibrium between the animals, plants, and bacteria can be maintained for extended periods of time.

It is a further object of the present invention to provide an aquarium ecosystem for the home at low cost.

It is yet another object of the present invention to provide circulation of the water contained in the aquarium throughout the entire system.

Another object of the present invention is to provide an aquarium ecosystem that is simple to operate and maintain.

It is still a further object of the present invention to provide an aquarium ecosystem that may easily be added to existing home aquariums.

SUMMARY OF THE INVENTION

The present invention is a self-sustaining aquarium ecosystem for aquatic life that preferably comprises a main tank and a filter tank. A first conduit connects an outlet of the main tank to an inlet of the filter tank. The first conduit allows water from the main tank to be drained into the filter tank. The filter tank preferably comprises a carbon filter, a plant section, a compartment with material suitable to house bacteria and remove particulate matter produced by fish, and an means for adding air to the water. In a preferred embodiment, a pump receives water from an outlet of the filter tank and forces the water through an ultraviolet light purifier and the second conduit back into said main tank.

The preferred embodiment of the aquarium ecosystem also includes a cover or hood for each tank. The covers advantageously house a light source to simulate day and night for each tank. A separate light source with an independent switch to control the amount of light is provided for each tank.

For improved circulation and water distribution in the main tank the outlet is positioned near the top of the main tank. The main tank is preferably positioned above the filter tank for draining water from the main tank to the lower tank. Distal the outlet, the inlet is positioned near the bottom of the tank thereby providing bottom to top circulation. A check valve is included to prevent the water from draining from the inlet into the filter tank if the pump fails. The circulation is further improved by tubes connected to the inlet to uniformly distribute the purified incoming water about the bottom of the tank.

DESCRIPTION OF THE PREFERRED EMBODIMENT

Figure 1:
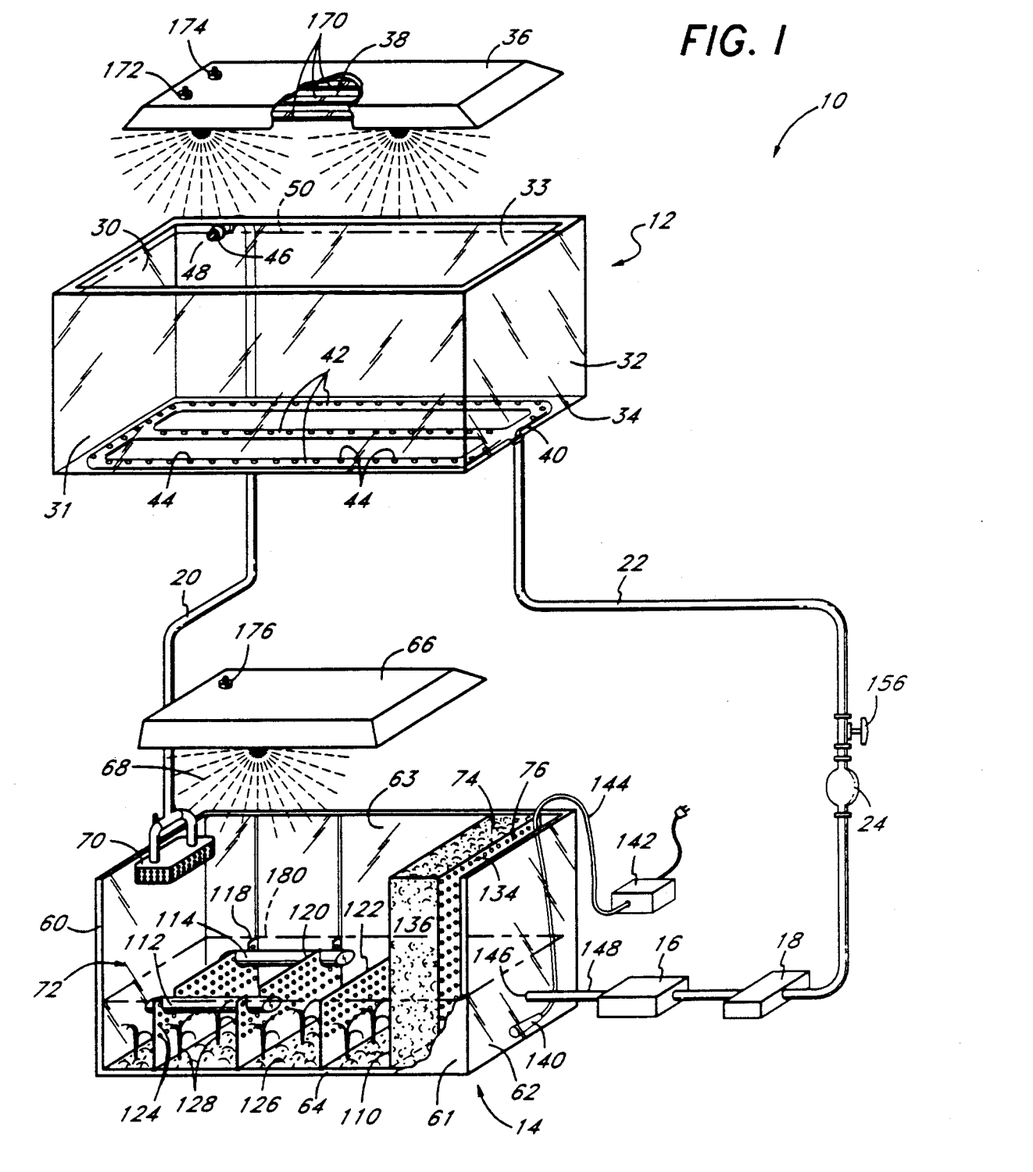
FIG. 1 is a perspective view, partially in section, of the preferred embodiment of the aquarium ecosystem of the present invention.

Aquatic animals living in aquariums add impurities to the water merely by their existence. These impurities can be harmful to the animals if allowed to accumulate. However, the impurities are food for other life forms such as plants and bacteria. Plants and in turn bacteria transform the impurities into a state that is harmless and sometimes beneficial to the animals. An ecosystem is an equilibrium or balance between the amount of impurities produced by the animals and amount of impurities consumed by plants and bacteria. In a preferred embodiment, the present invention is an aquarium ecosystem 10 for the home aquarium. The aquarium ecosystem 10 advantageously has the elements required to maintain a continuous nitrification process. As illustrated in FIG. 1, the aquarium ecosystem 10 comprises a main tank 12, a filter tank 14, a water pump 16, an ultraviolet light purifier 18, conduits 20, 22, and a check valve 24. The main tank 12 contains the appropriate medium, water or salt water, to provide an environment in which the marine animals live and are exhibited. An ecosystem is created by adding the filter tank 14 which includes plants and bacteria to remove the contaminants produced by the animals. The two tank system of the present invention advantageously allows continuous nitrification and photosynthesis processes by circulating the water through the filter tank 14.

As illustrated in FIG. 1, the main tank 12 preferably has a generally rectangular shape with four side walls 30–33 and a bottom 34. The walls 30–33 and bottom 34 are preferably constructed of a transparent material for viewing the contents of the tank 12. While the shape of the main tank 12 is described as rectangular, it should be understood that the main tank 12 may take various other shapes such as cylindrical, circular or triangular.

The main tank 12 further comprises a cover or hood 36. The cover 36 keeps dust and other foreign matter out of the main tank 12. Preferably, the cover 36 houses a light source 38. The light source 38 is attached on the bottom side of the cover 36 and is directed down toward the surface of the water in the main tank 12. In the preferred embodiment, the light source 38 is four elongated tubular lamps 170 displaced along the underside of the cover 36. The light source 38 enhances the view of the contents of the main tank 12, and acts as sunlight to simulate an environment best suited for the fish being kept in the main tank 12. The light source 38 has switches 172, 174 to control the light source 38 and simulate morning, day and evening. In a preferred embodiment, each switch 172, 174 controls two lamps 170. Thus, either switch 172, 174 can be activated alone to simulate the light in the morning and evening while both switches 172, 174 may be used to simulate day lighting.

An inlet port 40 allows water to be pumped into the main tank 12. The inlet 40 is located on the side wall 32 near the bottom 34 of the tank 12. The inlet 40 is connected to a series of tubes 42. The tubes 42 parallel each other and extend across the length of the main tank 12. Each tube 42 has several holes 44 equally spaced along its length. In an exemplary embodiment, the holes 44 are spaced along the top of the tubes 42 approximately 3 inches apart with each hole 44 having a diameter of $\frac{1}{8}$ of an inch. It should be understood that the holes 44 may vary in diameter with the holes 44 farthest from the inlet 40 being larger to compensate for reduced pressure and achieve a uniform distribution of water along the bottom 34. The holes 44 allow the clean incoming water to enter the main tank 12 at various positions along the bottom 34. The use of the tubes 42 provides excellent and even distribution of clean water from all areas of the bottom which causes debris to be moved to the surface. In a preferred embodiment, the tubes 42 are covered with gravel or coral (not shown) to hide them from view. Since the gravel is porous, the water entering the main tank 12 flows through the tubes 42 into the gravel and then eventually into the tank 12. The gravel also provides a home for bacteria beneficial to animals in the main tank 12. The bacteria breaks down ammonia and is useful in the nitrification process.

The water is removed from the main tank 12 through an outlet port 46 on the rear side 33 of the main tank 12. The outlet 46 is spaced a few inches below the top of the main tank 12 just beneath a high water mark 50. The positioning of the outlet 46 is advantageous in several respects. The positioning of the outlet 46 helps remove any debris from the surface of the water. Since the inlet 40 to the main tank 12 is near the bottom 34, the water flows from bottom to top and forces floating debris and feces to the surface where it is removed through the outlet 46. Gravel filters used in the prior art to collect larger debris are unneeded because the waste is drawn into the circulation current and down to the filter tank 14. The current flow also eliminates the need for power heads or water pumps which are sometimes positioned inside the tank to improve circulation. The present system provides excellent bottom to top circulation of the water in the main tank 12 by positioning the inlet 40 and distributing tubes 42 along the bottom 34 of the tank 12 and positioning the outlet 46 near an upper rear corner of the tank 12. The positioning of the outlet 46 also eliminates any need to pump the water from the main tank 12 to the filter tank 14 since the force of gravity draws the water into the outlet 46 and down to the filter tank 14. The positioning of the outlet 46 also prevents too much water from being removed because once the water level 50 in the main tank 12 falls below the level of the outlet 46, water cannot be removed to the filter tank 14.

Figure 2A:
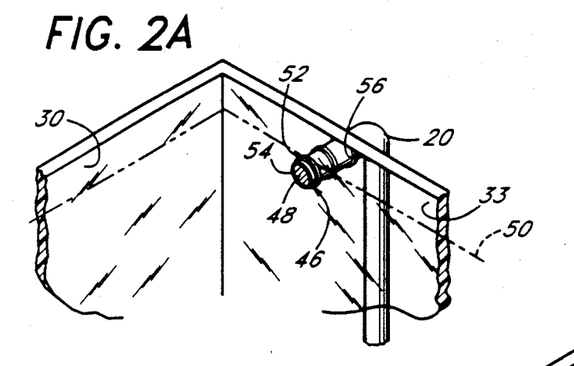
FIG. 2A is a perspective view of a preferred embodiment of the outlet and connector from the main tank.
Figure 2B:
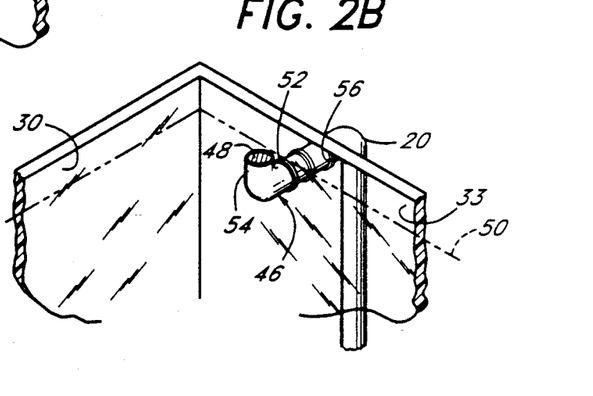
FIG. 2B is a perspective view of an alternate embodiment of the outlet and connector from the main tank.

As shown in FIGS. 2A and 2B, the outlet 46 is a tubular connector extending through a circular hole 52 in the rear wall 33. The outlet 46 is attached and sealed to the rear wall 33 to prevent any water from leaking from the main tank 12 except through the outlet 46. The outlet 46 need only extend a few inches into the main tank 12 which is advantageous because the outlet 46 does not obstruct one's view of the animals in the aquarium. The small proportions of the outlet 46 are also advantageous because more space is left in the aquarium for the animals. A screen or grate 48 is attached to cover an interior end 54 of the outlet 46. The screen 48 prevents fish and other animals from exiting the main tank 12 and entering the filter. As shown in FIG. 2A, the outlet 46 is preferably a straight tubular member with the water entering in a horizontal direction. As shown in FIG. 2B, the outlet 46 may have an alternate embodiment where it has an L-shape with the interior end 54 opening upward for a downward intake of water.

Attached to an exterior end 56 of the outlet 46 is a conduit 20. The conduit 20 provides a path for transporting the water from the main tank 12 to the filter tank 14. The conduit 20 is sealed on one end to the outlet 46 and on the other end to the filter tank 14 to prevent any leakage. The conduit 20 is preferably flexible tubing. This allows the filter tank 14 to be situated in various locations with respect to the main tank 12. For example, the filter tank 14 may be placed below the main tank 12 as illustrated in FIG. 1. While the tank 14 is illustrated as positioned below the main tank 12, it should be understood that the filter tank 14 may be positioned at the same level as the main tank 12. Even when the main tank 12 and the filter tank 14 are positioned at the same level, water is able to drain from the outlet 46 near the top of the main tank 12 into the filter tank 14 because the water level 180 on the filter tank 14 is just above half its height, and therefore, substantially lower than the water level 50 in the main tank 12.

As shown in FIG. the filter tank 14 has a generally rectangular shape defined by four side walls 60–63 and a bottom 64. The size of the filter tank 14 is dependent in part on the volume of the main tank(s) 12 that it cleans. It should be noted that a single filter tank 14 may be used to clean several main tanks 12 if the filter tank 14 is large enough. In an exemplary embodiment, the filter tank is about 36" in length, 16" in width and 17" in height.

The filter tank 14 also comprises a cover 66 that houses a light source 68. The cover 66 and light source 68 are like those described above for the main tank 12, but adapted to the size of the filter tank 14. A switch 176 controls the light 68 of the filter tank 12 and is advantageously independent from the switches 172, 174 for the light source 38 of the main tank 12. This allows the environment of the main tank 12 to be tailored to an amount of light best for animals while the amount of light in the filter tank 14 is set at a level most beneficial for plants and bacteria.

The filter tank 14 is divided into several compartments and additionally comprises a carbon filter 70, a plant and temperature section or compartment 72, a bacteria filter 74, and an aerator compartment 76. Each compartment removes several different impurities in the water passing therethrough and the filter tank 14 has built in redundancy to fully clean the water. It should be realized that the filter tank 14 may be used with various existing aquariums by simply adapting the inlet 40 and outlet 46 for attachment to main aquariums as known to one skilled in the art.

Figure 3:
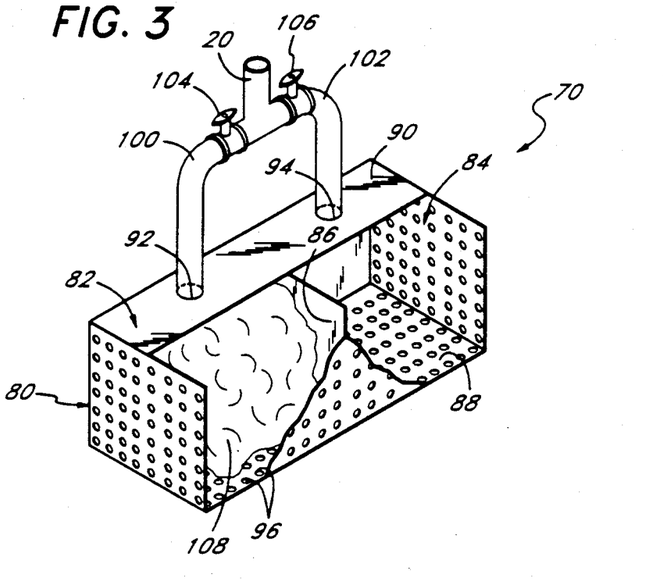
FIG. 3 is a perspective view, partially in section, of the control valves and the carbon filter of the present invention.

The stream of water from the main tank 12 is first processed by the carbon filter 70. The carbon filter 70 is preferably centered near the top of the side wall 60 of the filter tank 14, but the carbon filter 70 could be mounted in a variety of locations on the side wall 60. In the preferred embodiment, the carbon filter 70 has a rectangular housing 80 as illustrated in FIG. 3. A solid center wall 86 divides the housing 80 into a first and a second compartment 82, 84 of about the same size. A top wall 90 partially encloses both compartments 82 and 84 of the housing 80. The housing 80 is only partially enclosed for easy access to the compartments 82 and 84 of the filter 70. The top wall 90 has two openings 92 and 94 that permit access to the first and second compartments 82 and 84, respectively. The housing 80 also has sides and a bottom 88 with a series of holes 96 that allow any liquids entering the compartments 82 and 84 to be drained therethrough. Thus, the force of gravity is relied upon to draw the water through the carbon filter 70.

The carbon filter 70 has a unique construction with two alternate paths for the water to travel from the main tank 12 to the filter tank 14. The conduit 20 is attached through the top of filter tank 14 to two connectors 100 and 102. One connector 100 couples the conduit 20 from the main tank 12 to the first compartment 82. The other connector 102 couples the conduit 20 from the main tank 12 to the second compartment 84. The first connector 100 has a first valve 104 and the second connector 102 has a second valve 106 to regulate the flow of water into each compartment 82 and 84. For example, the first valve 104 may be opened and the second valve 106 may be closed to direct the water through the first connector 100 and into the first compartment 82. Similarly, the second valve 106 may be opened and first valve 104 closed to direct the water into the second compartment 84. Also, both valves 104, 106 may be closed to prevent any water from leaving the main tank 12 if the filter tank 14 has too much water.

The first compartment 82 preferably comprises carbon 108, preferably charcoal, to remove many of the contaminates created by the animals in the main tank 12. The water is poured over the carbon 108 which absorbs proteins, lipids, feces and other by-products produced by the fish in the main tank 12. The carbon 108 also removes undesirable odors and improves the clarity of the water. The use of the first compartment 82 advantageously makes a protein skimmer unnecessary. The second compartment 84 preferably contains no carbon and provides a path to effectively circumvent the carbon 108. There are certain instances where it is advantageous to avoid the carbon 108. For example, when medication for the animals or liquid food for coral is placed into the main tank 14, it is advantageous to avoid the carbon 108 because the carbon 108 will remove the food or medicine inserted into the water.

While the carbon filter 70 has been described above as having two compartments, it should be understood that the filter tank 14 is able to function properly and effectively as an ecosystem with a single compartment filter containing carbon.

After the water is discharged from the carbon filter 70, it drops into the plant and temperature section 72 near the left side wall 60. Most of the filter tank 14 is occupied by the plant and temperature section 72 which preferably extends from the left side wall 60 to a divider 110. The divider 110 is attached between the front 61 and rear 63 walls of the filter tank 14 and is substantially perpendicular to them. The plant and temperature section 72 is further partitioned by three baffles 118, 120 and 122. These baffles 118, 120 and 122 ar ⓡall parallel to the divider 110 and attached to the front wall 61 and rear wall 63. The baffles 118, 120 and 122 divide the plant and temperature section 72 into four areas about equal in space. The level of the water in the filter tank 14 is relatively shallow and in an exemplary embodiment slightly greater than half the height of the filter tank 14. Thus, the baffles 118, 120 and 122 need not extend the full height of the filter tank 14. Each baffle 118, 120 and 122 has a number of holes 124 extending across an area from the top of the baffle 118, 120 and 122 down toward the bottom. In an exemplary embodiment, the baffles 118, 120 and 122 have a height of 6" and the holes 124 extend over an area from the top of the baffles 118, 120 and 122 about 4" downward. The holes 124 allow the water to flow between the four areas. The baffles 118, 120 and 122 advantageously diffuse and slow the flow of the water as it proceeds toward the divider 110.

The plant and temperature section 72 additionally comprises gravel 126, plants and algae 128 in each of the four areas. The baffles 118, 120 and 122 help to slow the flow of water through the plant and temperature section 72 which allows the plants and algae 128 to grow. The gravel 126 is deposited along the bottom 64 of the filter tank 14. The gravel 126 helps hold the plants 128 in place and provides a home for bacteria (not shown) essential in the nitrification process. The bacteria break down ammonia into nitrogen compounds which the plants 128 consume. The light provided by the source 68 in the cover 66 together with the plants 128 also removes carbon dioxide ($CO_2$) in the water through photosynthesis. The plants 128 even help to make the water clearer. Thus, the bacteria and plants 128 consume carbon dioxide, harmful nitrogen compounds and other impurities and produce oxygen and plant growth. The placement of the plants 128 and bacteria in the separate filter tank 14 is particularly advantageous because the separate light source 68 can be controlled independently from the source 38 for the main tank 12 and thereby provide continuous removal of impurities since the presence of light allows continuous photosynthesis and nitrification.

The plant and temperature section 72 further comprises a heater 112 and a cooler 114. The placement of the heater 112 and cooler 114 in the filter tank 14 allow the temperature of the main tank 12 to be controlled because the water is continuously circulated through the filter tank 14. The placement of the heater 112 and cooler 114 in the filter tank 14 is advantageous because a greater amount of space is available in the main tank 12 for animals and the heater 112 and cooler 114 will not obstruct the view of the contents of the main tank 12. Both the heater 112 and the cooler 114 have an elongated cylindrical shape. The heater 112 and the cooler 114 are space apart from each other near the bottom 64 of the filter tank 14 to prevent unnecessary heating and cooling that may result if the two were place in close proximity. As illustrated in FIG. 1, the heater 112 and cooler 114 are preferably positioned parallel to the longitudinal axis of the filter tank 14 in the plant and temperature section 72 with the heater 112 near the front wall 61 and the cooler 114 near the rear wall 63. As shown, two baffles 118 and 120 are adapted to receive the heater 112 and the cooler 114. Each baffle 118 and 120 has areas cut away near the front and rear wall 61, 63. Since most of the water flows down the middle of the filter tank 14, the heater 112 and the cooler 114 are able to heat or cool the temperature of large amounts of water.

In the preferred embodiment, both the heater 112 and the cooler 114 have a thermostat. The thermostat is a temperature sensitive coating on the exterior of a heating or freezing plate 160. One thermostat controls the use of the heater 112. If the temperature of the water as measured by the thermostat falls below a specified level then the heater 112 is turned on. Similarly, if the temperature of the water rises above a specified level measured by the other thermostat, then the cooler 114 is turned on to lower the water temperature. Thus, a temperature range for the water in the main tank 12 can be specified by setting the temperature at which the thermostats will activate either the heater 112 or cooler 114. For example, in the aquarium ecosystem 10, the heater 112 may be set to turn on if the temperature falls below 72° F. and the cooler 114 will turn on if the water temperature rises above 78° F.

Figure 5:
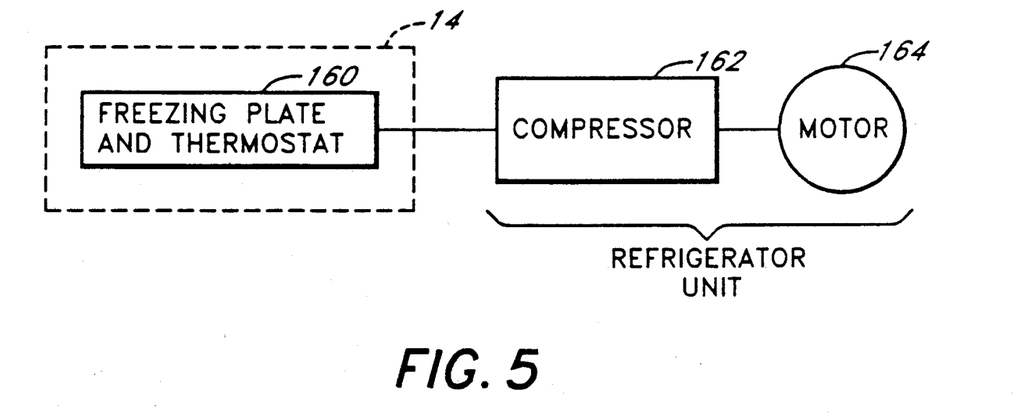
FIG. 5 is schematic representation of a preferred embodiment of the cooler of the present invention.

As illustrated in the schematic diagram of FIG. 5, the cooler 114 is preferably constructed similar to a refrigerator. The cooler 114 has a freezing plate 160, a compressor 162 and a motor 164. The motor 164 runs constantly and is selectively used to drive the compressor as cooling is needed. To cool the temperature of the water, the compressor 162 is activated by the thermostat in the filter tank 14. Once activated, the compressor 162 causes the temperature of the freezing plate 160 to be reduced. The freezing plate 160 is enclosed in a container to prevent corrosion and then positioned in the water in the plant and temperature section 72. The water is cooled as it passes over the plate 160. The heater 112 has a similar design with a heater element enclosed in a waterproof container and disposed in the filter tank 14. The thermostat is also a temperature sensitive coating on the heater element that activates the heater element and the water is heated as it passes over the heater element.

A second divider 134, similar to the first divider 110, partitions the remaining space in the filter tank 14 between the first divider 110 and the right side wall 62 into the bacteria filter 74 and the aerator compartment 76. The bacteria filter 74 preferably comprises a pad 136 of fibrous material or coral sand placed between the two dividers 110 and 134. For example, the pad 136 may be cotton, wool, or polyester such as the commercially available pads known as spiral blue pads or DSL spools. The pad 136 forms a home for more bacteria that break down any remaining harmful nitrogen compounds through the nitrification process. Additionally, the bacteria filter 74 will also prevent any particles suspended in the water from being pumped back into the main tank 12.

The final compartment in the filter tank 14 is the aerator compartment 76. The aerator compartment 76 further comprises an air stone 140, a pump 142 and a hose 144. Unlike the other parts of the filter tank 14, the aerator compartment 76 does not remove any impurities from the water. The aerator compartment 76 replenishes the oxygen in the water by pumping air through the water in the empty compartment 76. The pump 142 is placed outside the filter tank 14 and forces air into the aerator compartment 76. The air pump 142 is connected to the air stone 140 located near the bottom 64 of the filter tank 14 with the air hose 144. The air stone 140 is porous and diffuses the air pumped through it into the water. The air stone 140 is advantageously placed in front of an outlet port 146 thereby adding oxygen before the water leaves the filter tank 14. The outlet port 146 is preferably an opening in the side wall 62 at about half way between the high water level 180 and the bottom 64 of the filter 14.

The output port 146 of the filter tank 14 is connected by a conduit 148 to the pump 16. The pump 16 draws water from the filter tank 14 and forces it through the ultraviolet light purifier 18, the check valve 24 and then into the main tank 12. In a preferred embodiment, the pump 16 is working continuously to provide constant circulation of the water in the main tank 12 through the filter tank 14. The ultraviolet light purifier 18 sterilizes the water before it is returned to the main tank 12. Exposing the water to ultraviolet light will kill most microorganisms, including any harmful bacteria and parasites in the water.

Figure 4:
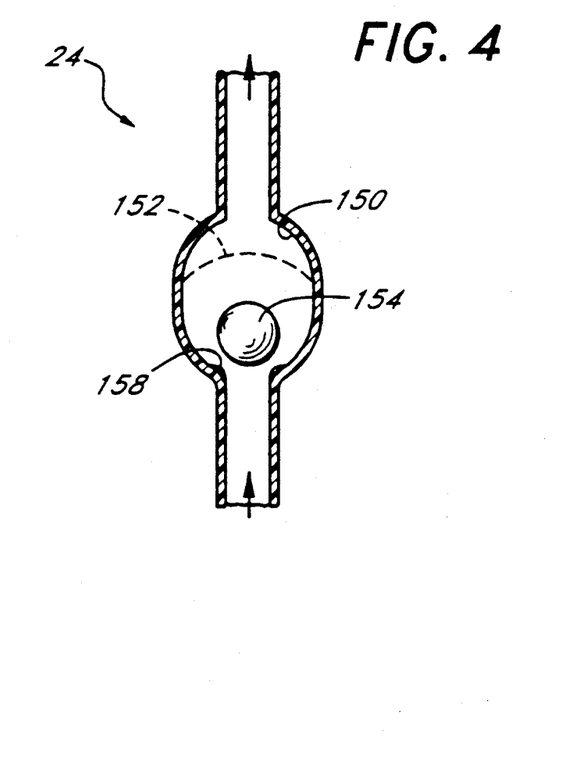
FIG. 4 is a cross-sectional view of the check valve of the present invention.

The check valve 24 prevents the water in the main tank 12 from draining into the filter tank 14 in the event of a power failure or any other circumstance where the pump 16 is inoperable. As illustrated in FIG. 1, the filter tank 14 may be positioned at a lower level than the main tank 12. With such positioning, there is a danger that the main tank 12 will drain into and overflow the filter tank 14 if the pump 16 fails. The check valve 24 is used to eliminate this danger. It should be understood that in circumstances where the tanks 12, 14 are positioned at the same level, the check valve 24 will be unnecessary. As illustrated in FIG. 4, the check valve 24 comprises a spherical casing 150, a screen 152 and a ball 154. The screen 152 separates the spherical casing 150 into two sections with the ball 154 located in the lower section. The screen 152 prevents the ball 154 from blocking the outlet, and thus, the flow of water into the main tank 12. However, the ball 154 can block the inlet to prevent water from flowing down from the main tank 12 to the pump 16. If water stops flowing up toward the tank 12, the force of gravity will automatically drive the ball 154 downward and block the inlet to prevent water from draining from the main tank 12. Additionally, the area near the inlet has a protusion 158 preferably sized to fit the ball 154 and made of soft plastic or rubber to prevent any leakage into the filter tank 14. While the valve 24 shown in FIG. 4 and described above is preferred, it should be understood the aquarium ecosystem may use other types of check valves.

Additionally, as shown in FIG. 1, a control valve 156 is coupled between the main tank 12 and the check valve 24. The control valve 156 is used to open or close the conduit 22 between the main tank 12 and the filter 14. For example, the control valve 156 may be closed to prevent the flow of water during maintenance or repair of the filter tank 14, pump 16 or ultraviolet light purifier 18.

What is claimed is:

1. An apparatus for creating a self-sustaining ecosystem for aquatic life comprising:
   a main water tank having an inlet and an outlet;
   a filter tank having an inlet and an outlet connected to the main tank and further comprising:
      a plant section, and
      a compartment with material suitable to house bacteria and remove particulate matter produced by fish;
   a first conduit connected between the outlet of the main tank and the inlet of the filter tank;
   a second conduit connected between the inlet of the main tank and the outlet of the filter tank;
   a pump for pumping water from said filter tank into said main tank; and
   a first light source providing light to the main tank, said first light source having a switching means for turning the light source on or off to simulate the light conditions of morning, day and evening; and
   a second light source providing light to the filter tank, the second light source having a second switch which allows the second light source to be turned on or off independent from said first light source.

2. An apparatus for creating a self-sustaining ecosystem for aquatic life comprising:
   a main water tank having an inlet and an outlet;
   a filter tank having an inlet and an outlet connected to the main tank and further comprising:
      a carbon filter wherein the carbon filter comprises a first compartment containing carbon and an empty second compartment, and valving to direct the flow of the water from the main tank into the first or second compartment,
      a plant section, and
      a compartment with material suitable to house bacteria and remove particulate matter produced by fish;
   a first conduit connected between the outlet of the main tank and the inlet of the filter tank;
   a second conduit connected between the inlet of the main tank and the outlet of the filter tank; and
   a pump for pumping water from said filter tank into said main tank.

3. An apparatus for creating a self-sustaining ecosystem for aquatic life comprising:
   a main water tank having an inlet and an outlet;
   a filter tank having an inlet and an outlet connected to the main tank and further comprising:
      a plant section, wherein the plant section comprises plants, algae and bacteria for breaking down impurities added by the animals in the main tank, and wherein the plant section further comprises a plurality of baffles having holes therein to reduce the speed of the water through the plant section, and
      a compartment with material suitable to house bacteria and remove particulate matter produced by fish;
   a first conduit connected between the outlet of the main tank and the inlet of the filter tank;
   a second conduit connected between the inlet of the main tank and the outlet of the filter tank; and
   a pump for pumping water from said filter tank into said main tank.

4. An apparatus for creating a self-sustaining ecosystem for aquatic life comprising:
   a main water tank having an inlet and an outlet;
   a filter tank having an inlet and an outlet connected to the main tank and further comprising:
      a plant section, wherein the plant section comprises a heater and a cooler to maintain the temperature of the water between a predetermined range, and
      a compartment with material suitable to house bacteria and remove particulate matter produced by fish;
   a first conduit connected between the outlet of the main tank and the inlet of the filter tank;
   a second conduit connected between the inlet of the main tank and the outlet of the filter tank; and
   a pump for pumping water from said filter tank into said main tank.

5. An apparatus for housing aquatic life comprising:
   a main tank having a water inlet and a water outlet;
   a distributor in the tank connected to the inlet to uniformly distribute purified incoming water about the main tank wherein said distributor comprises a plurality of parallel tubes in side-by-side relation extending along substantially the entire length of the bottom of the main tank, the tubes having holes spaced substantially equally apart along their lengths;
   a filter tank comprising an ecosystem filter and having an inlet and an outlet;
   a first conduit connected between the outlet of the main tank and the inlet of the filter tank;
   a second conduit connected between the inlet of the main tank and the outlet of the filter tank; and
   a pump for pumping water from said filter tank into said main tank.

6. The apparatus of claim 5, wherein said holes in the tubes are of larger size in the positions distal the inlet to uniformly distribute the purified incoming water along the bottom of the main tank.

7. An apparatus for housing aquatic life comprising:
a main tank having a water inlet and a water outlet, wherein the inlet to the main tank is located proximate the bottom of the main tank and the main tank outlet is located near the top of the main tank thereby providing bottom to top circulation, and wherein the outlet is located slightly below the top of the main tank permitting the flow of water through the first conduit to the filter tank, and maintaining the water level of the main tank at or lower than the level of the outlet;
a distributor in the tank connected to the inlet to uniformly distribute purified incoming water about the main tank;
a filter tank comprising an ecosystem filter and having an inlet and an outlet, wherein the filter tank is located beneath the main tank such that water will flow by gravity through the first conduit, to the filter tank inlet, and the apparatus further comprises a check valve attached to the second conduit to prevent water in the main tank from draining into the filter tank;
a first conduit connected between the outlet of the main tank and the inlet of the filter tank;
a second conduit connected between the inlet of the main tank and the outlet of the filter tank; and
a pump for pumping water from said filter tank into said main tank.

8. The apparatus of claim 7, wherein the filter tank outlet is located spaced above the bottom of the filter tank so that the filter tank cannot be pumped empty by the pump.

9. The apparatus of claim 7, wherein the filter tank includes a compartment with material suitable to house bacteria and remove particulate matter produced by fish.

10. The apparatus of claim 7, wherein the apparatus further comprises a purifier connected to said pump, said purifier exposing the water to ultraviolet light.

11. The apparatus of claim 7, including a light source providing light to the main tank, the light source having a switching means for turning the light source on or off to simulate the light conditions of morning, day and evening.

12. The apparatus of claim 11, including a hood to cover the main tank and house the light source.

13. The apparatus of claim 7, including a carbon filter in the filter tank.

14. The apparatus of claim 7, wherein the filter tank includes a plant section wherein said plant section comprises plants, algae and bacteria for breaking down impurities added by the animals in the main tank.

15. The apparatus of claim 7, including means for adding air to the water in the filter tank.

16. A device for use with an aquarium to create an ecosystem, comprising:
a filter tank;
a carbon filter in the filter tank;
a plant compartment in the filter tank;
a material in the tank suitable to house bacteria and for removing particulate matter produced by fish;
means for adding air to the water in the filter tank; and
a light source providing light to the filter tank and a switch which allows the light source to be turned on or off;
a first conduit for conducting water from the aquarium to the filter tank;
a second conduit for conducting water to the aquarium from the filter tank;
a pump for returning water from said filter tank into said main tank; and
a purifier connected to the pump and the second conduit for exposing the water to ultraviolet light.

17. The apparatus of claim 16, wherein the plant compartment further comprises plants, algae and bacteria for breaking down impurities added by the animals in the main tank.

18. The apparatus of claim 16, wherein the material suitable to house bacteria is a fibrous material or coral sand.

19. The apparatus of claim 16, wherein the means for adding air to the water comprises an air stone, air hose and an air pump.

20. A device for use with an aquarium to create an ecosystem, comprising:
a filter tank;
a carbon filter in the filter tank, wherein the carbon filter comprises first and second compartments, the first compartment containing carbon, and valving to direct the flow of the water from the aquarium into the first or second compartment;
a plant compartment in the filter tank;
a material in the tank suitable to house bacteria and for removing particulate matter produced by fish;
means for adding air to the water in the filter tank;
a light source providing light to the filter tank and a switch which allows the light source to be turned on or off;
a first conduit for conducting water from the aquarium to the filter tank;
a second conduit for conducting water to the aquarium from the filter tank;
a pump for returning water from said filter tank into said main tank; and
a purifier connected to the pump and the second conduit for exposing the water to ultraviolet light.

21. A device for use with an aquarium to create an ecosystem, comprising:
a filter tank;
a carbon filter in the filter tank;
a plant compartment in the filter tank, wherein the plant compartment comprises plants, algae and bacteria for breaking down impurities added by the animals in the main tank, and wherein the plant compartment further comprises a plurality of baffles having holes therein to reduce the speed of the water through the plant compartment;
a material in the tank suitable to house bacteria and for removing particulate matter produced by fish;
means for adding air to the water in the filter tank;
a light source providing light to the filter tank and a switch which allows the light source to be turned on or off;
a first conduit for conducting water from the aquarium to the filter tank;
a second conduit for conducting water to the aquarium from the filter tank;
a pump for returning water from said filter tank into said main tank; and
a purifier connected to the pump and the second conduit for exposing the water to ultraviolet light.

22. The apparatus of claim 21, wherein the plant compartment further comprises a heater and a cooler to maintain the temperature of the water in a predetermined range.

23. A method of filtering and circulating water in an aquarium comprising the steps of:
   draining water from the aquarium to a filter using an outlet just below the top of the aquarium;
   passing the water through the filter in a filter tank having plants and bacteria for the nitrification process;
   controlling the water level in the main tank by continuously pumping clean water from the filter tank into the aquarium through an inlet;
   distributing the water in the aquarium by discharging the water from the filter tank through a series of tubes attached to the inlet on the inside of the aquarium; and
   adding air to the water in the filter tank after the water has been cleansed but before it is pumped into the aquarium.

24. A method of filtering and circulating water in an aquarium comprising the steps of:
   draining water from the aquarium to a filter using an outlet just below the top of the aquarium;
   passing the water through the filter in a filter tank having plants and bacteria for the nitrification process;
   controlling the water level in the main tank by continuously pumping clean water from the filter tank into the aquarium through an inlet;
   distributing the water in the aquarium by discharging the water from the filter tank through a series of tubes attached to the inlet on the inside of the aquarium; and
   controlling the temperature of the water using a heater and cooler in the filter tank.

25. An apparatus for creating a self-sustaining ecosystem for aquatic life comprising:
   a main water tank having an inlet and an outlet; and
   a filter tank having an inlet and an outlet connected to the main tank and further comprising:
      a carbon filter proximal said filter tank inlet for absorbing waste materials produced by fish in the main tank;
      a plant compartment distal said carbon filter to which water flows after passing through said carbon filter, said plant compartment containing plants and bacteria for consuming harmful compounds and other impurities and for producing oxygen, said plant compartment further including a heater and a cooler for control of temperature within said compartment;
      a bacteria filter distal to said plant compartment for housing bacteria for breaking down harmful compounds remaining in water passing from said plant compartment; and
      an aerator compartment distal to said bacteria filter having means for replenishing the oxygen in the water passing from said bacteria filter.

26. The apparatus of claim 25, including an ultraviolet light purifier distal said aerator compartment for destroying harmful organisms in the water.

27. The apparatus of claim 25, said filter tank being positioned below said main tank, and said main tank outlet comprising an opening proximal the top of said main tank, such that water drains from said main tank to said filter tank via said opening solely by force of gravity.

28. A method of filtering and circulating water in an aquarium comprising the steps of:
   providing an opening proximal the top of the aquarium;
   providing a first conduit from said opening to a filter tank;
   positioning said filter tank below said aquarium;
   draining dirty water from said aquarium to said filter tank through said opening and said first conduit by the force of gravity;
   passing the dirty water through said filter tank to cleanse the water;
   pumping cleansed water from said filter tank back up to said aquarium through a second conduit by a pump; and
   providing a check valve on said second conduit to prevent cleansed water from draining back into said filter tank.

29. An apparatus for creating a self-sustaining ecosystem for aquatic life comprising:
   a main water tank having an inlet and an outlet, said outlet being located below the top of the main tank;
   a filter tank having an inlet and an outlet connected to the main tank, said filter tank comprising an ecosystem filter for cleansing water from said main water tank, and said filter tank being positioned below said main tank so that water may flow by gravity from the main tank, through said main tank outlet, through a first conduit connecting said main tank outlet to said filter tank inlet, and into said filter tank;
   a second conduit connecting said main tank inlet to said filter tank outlet;
   a pump for pumping water from said filter tank into said main tank; and
   a first light source for providing light to the main tank and a second light source for providing light to the filter tank, said first and second light sources having independent switching means.

* * * * *